United States Patent [19]

Vesborg

[11] Patent Number: 4,946,080
[45] Date of Patent: Aug. 7, 1990

[54] FLUID CONTAINER WITH DOSAGE ASSEMBLY

[75] Inventor: Stten Vesborg, Brussels, Belgium

[73] Assignee: Colgate-Palmolive Company, Piscataway, N.J.

[21] Appl. No.: 340,184

[22] Filed: Apr. 19, 1989

[30] Foreign Application Priority Data

Apr. 13, 1988 [DK] Denmark .................... 2030/88
Mar. 31, 1989 [DK] Denmark .................... 1582/89

[51] Int. Cl.⁵ ............................................ G01F 11/00
[52] U.S. Cl. ..................... 222/500; 222/212; 222/439; 222/454; 222/521
[58] Field of Search ............ 222/212, 213, 434, 437, 222/438, 439, 440, 444, 450, 453, 454–457, 476, 477, 500, 519–525, 547, 564

[56] References Cited

U.S. PATENT DOCUMENTS

| | | | |
|---|---|---|---|
| 2,141,870 | 12/1938 | Koukal | 222/500 X |
| 3,146,923 | 9/1964 | Chappell | 222/500 X |
| 3,567,079 | 3/1971 | Weigand | 222/500 X |
| 4,383,623 | 5/1983 | Page, III | 222/521 |
| 4,407,435 | 10/1983 | Harmon | 222/481 |
| 4,582,230 | 4/1986 | Vierkotter | 222/500 X |
| 4,728,011 | 3/1988 | Schuster et al. | 222/500 X |
| 4,779,764 | 10/1988 | Debetencourt | 222/521 X |
| 4,811,871 | 3/1989 | Wass et al. | 222/500 X |

Primary Examiner—Kevin P. Shaver
Attorney, Agent, or Firm—Richard J. Ancel; Robert C. Sullivan; Murray M. Grill

[57] ABSTRACT

A fluid container (1) with a dosage assembly (3) for delivering a metered amount of fluid through an outlet opening (32) when the container is turned 180°. The dosage assembly (3) includes a plunger (20) which is movable between positions which respectively open and block the outlet opening. A timer chamber (15) which includes an aperture (16) communicates with a passageway between the outlet opening (32) and the container through a feed opening 18. Metered amounts of fluid are dosed through the assembly by gravity movement of the plunger which controls fluid discharge.

20 Claims, 7 Drawing Sheets

FLUID CONTAINER WITH DOSAGE ASSEMBLY

FIELD OF THE INVENTION

A fluid container with a dosage assembly for delivering a metered amount of fluid through an outlet opening when the container is turned 180° and comprising a plunger moving during the metering of the dosage between a start position, providing a free passage for the fluid between the outlet opening and the fluid in the container, and a position, where the plunger blocks this passage and thus the outflow of fluid, and comprising a timer chamber defined by the plunger and having a timer aperture for controlling the movement of the plunger from its start position to its blocking position by means of the flow of fluid.

DESCRIPTION OF THE PRIOR ART

U.S. Pat. No. 4,407,435 discloses a dosage assembly to be sealingly installed in the opening of a container and provided with a tubular conduit for fluid extending into the interior of said container. The upper end of the conduit is provided with an outlet opening and the lower end with a smaller timer aperture. In the wall of the conduit between the outlet opening and the timer aperture there are inlet openings for the fluid. A cylinder-shaped plunger is displaceably and sealingly mounted in the conduit. When the container is in a vertical position the plunger is adjacent the lower end of the conduit in its start position. When the container is turned 180° fluid flows into the conduit through the inlet openings and further out through the outlet. Simultaneously the plunger moves down towards these inlet openings controlled by the flow of fluid, through the timer aperture and into the timer chamber below the plunger. Finally, during its movement, the plunger blocks the inlet openings to the conduit and thus the passage of fluid between the outlet opening and the interior of the container resulting in no more fluid being delivered. When the container is returned to its vertical position the plunger moves slowly down towards its start position at the bottom of the conduit while the fluid in the timer chamber flows out through the comparatively small timer aperture. In order to increase the velocity of the return of the plunger to its start position it is suggested to provide a countervalve in the inside of the plunger, said valve opening when the bottle is turned 180° after the dosing process so that the fluid flows out through plunger during its return movement. This solution is not satisfactorily, since a countervalve in the inside of the plunger renders the dosage assembly considerably more expensive. Another reason is that there is still a small amount of fluid in the conduit after the plunger has returned to its start position so that during a tilting of the container directly upon the return of the plunger the amount of fluid delivered is not exactly the same as the one delivered when the container has been left standing for some time subsequent to a delivery of fluid.

SUMMARY OF THE INVENTION

The object of the invention is to provide a container with a dosage assembly of the type described above and being of simple design and inexpensive to manufacture but nevertheless exact and reliable, also during dosing processes following closely upon each other.

The object of the invention is accomplished by the aperture of the timer chamber being connected with a passageway between the outlet opening and the interior of the container, and the timer chamber having a feed opening connected with the interior of the container when the plunger is in its start position.

As a result the timer chamber is substantially momentarily filled with fluid through the feed opening, when the container is turned 180° and gradually emptied during the movement of the plunger towards its blocking position so that the timer chamber is substantially empty when the plunger has reached its blocking position and the dosing process is finished. This causes the plunger to quickly drop to its start position, when the container is returned to its vertical position, as no fluid has to be displaced from the timer chamber. This enables a fast repetition of exact fluid dosages.

Suitable embodiments of the inventive container with dosage assembly are described in the subclaims.

BRIEF DESCRIPTION OF THE DRAWINGS

The invention is described in greater detail below and with references to the accompanying drawings, where.

DESCRIPTION OF THE PREFERRED EMBODIMENTS

Figure 1:
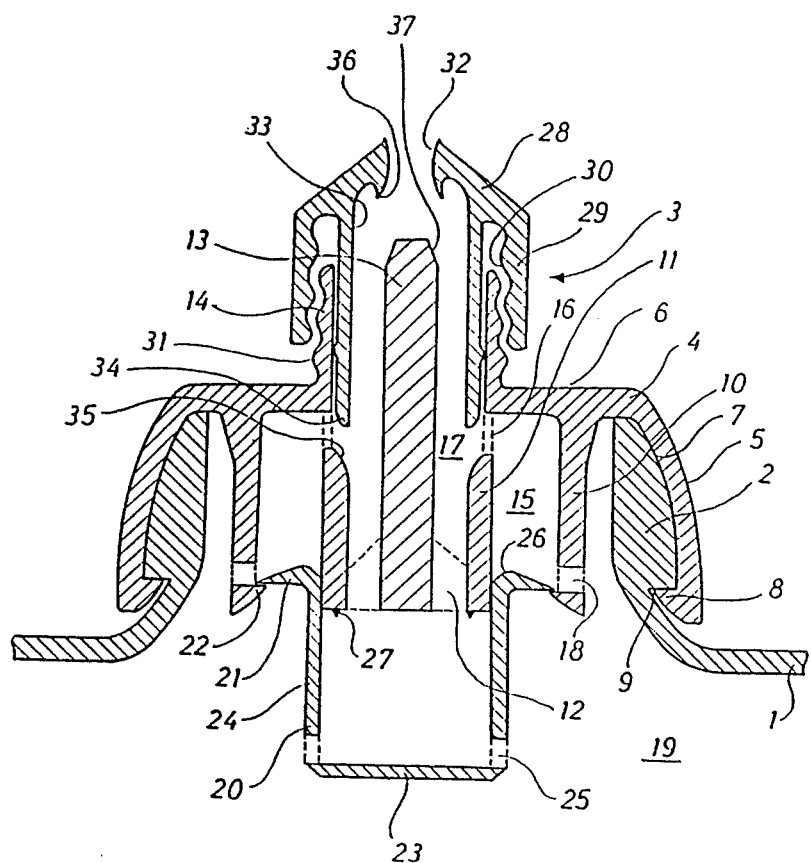
FIG. 1 is a diagrammatic view of a first embodiment of an inventive container with dosage assembly in the opening of the container.

FIG. 1 is a diagrammatic vertially sectional view through a container 1 with a neck 2 carrying a dosage assembly 3. The dosage assembly 3 comprises a stopper 4 with skirt (5) extending downwards from an upper terminal wall 6 and complementary to an outer surface 7 of the neck 2 and ending in a circular projection 8 in snapping engagement with a corresponding circular recess 9 in the neck 2. Radially inside the skirt 5 an outer cylindrical wall 10 extends axially into the opening of the neck 2. Radially inside the outer cylindrical wall 10 an inner cylindrical wall 11 extends from the upper terminal wall 6 and into the opening of the neck 2. The two cylindrical walls 10 and 11 are of substantially the same length. The inner end of said wall 11 is connected with a rod-shaped cylindrical body 13 via a number of webs 12, said body 13 extending away from the interior 19 of the container and centrally into a third cylindrical wall 14. The wall 14 extends outwards from the upper terminal wall 6 and is substantially a prolongation of the inner cylindrical wall 11.

Together the outer cylindrical wall 10 and the inner cylindrical wall 11 define a circular timer chamber 15.

Via a number of timer apertures 16 in the inner cylindrical wall 11 the timer chamber is at its upper end connected with a passageway 17 between the rod-shaped body 13 and the inner cylindrical wall 11 and the third cylindrical wall 14 respectively. At its lower end the timer chamber 15 is connected with the interior 19 of the container via a number of feed openings 18.

A cup-shaped plunger 20 with a flange 21 is arranged displaceable with respect to the stopper 4, the flange 21 being sealingly engaged with the outer cylindrical wall 10, and the inner cylindrical wall 11. A radially inwardly extending projection 22 at the lower end of the outer cylindrical wall 10 prevents the flange 21 of the plunger 20 from escaping from the timer chamber 15. Adjacent the bottom 23 of the cup-shaped plunger 20 there are a number of inlet openings 25 for the fluid in the cylindrical skirt 24. The side of the flange facing the timer chamber 15 is provided with a circular sealing bead 26. When the plunger is in its start position the distance of said bead 26 from the inner surface of the upper terminal wall of the stopper is substantially equal to the distance between the inner surface of the bottom 23 of the plunger 20 and a sealing bead 27 on the terminal surface of the inner cylindrical wall 11, cf. FIG. 1.

A cap 28 with an outer skirt 29 having an inner thread 30 is screwed onto the third cylindrical wall 14 of the stopper 4, said wall 14 being provided with a corresponding outer thread 31. Furthermore the stopper has a central outlet opening 32 and an inner skirt 33 extending into the passageway 17 parallel with the outer skirt 29 and sealingly engaging the inside of the third cylindrical wall 14.

By screwing the cap down the lower end of the inner skirt 33 blocks a constantly increasing part of timer apertures 16 between the timer chamber 15 and the passageway 17. When the cap is completely screwed down it blocks the apertures completely, as a lower bevelled surface 34 of the inner skirt 33 sealingly abuts a corresponding outer bevelled surface 35 at the bottom of the inner cylindrical wall 11. Simultaneously a sealing lip 36 adjacent the outlet 32 of the cap 28 sealingly abuts a bevel 37 at the upper end of the rod-shaped body 13 thus preventing an outflow through the dosage assembly 3.

When the container with dosage assembly is tilted or turned 180° the timer chamber 15 is substantially momentarily filled with the fluid in the container, said fluid flowing in through the feed openings 18. When the timer chamber 15 is substantially filled, fluid flows in through the inlet openings 25 in the plunger 23 and from there through the passageway 17 and out through the outlet opening 32. Simultaneously the plunger begins to move upward, cf. FIG. 1, i.e. downwards when the container is turned 180° due to the prevailing pressure, and the fluid in the timer chamber 15 flows out through the timer aperture 16 and into the passageway 17, a simultaneous flow of fluid into the timer chamber being prevented when the flange 21 of the plunger 20 has passed the feed opening 18. The direct outflow of fluid through the inlet openings 25 to the passageway 17 and out through the outlet opening 32 as well as the flow of fluid from the timer chamber 15 to the passageway 17 continues until the sealing bead 26 on the flange 21 of the plunger 20 abuts the inside of the terminal wall 6. Simultaneously the inside of the bottom 23 of the plunger 20 is to abut the sealing bead 27 on the inner cylindrical wall 11, resulting in the plunger blocking the flow of fluid through the dosage assembly. Subsequent to the finished dosing process and when the container is returned to its vertical position the plunger immediately drops back to its start position and a new dosing process can be started.

The amount of fluid delivered during the dosing process can be regulated by means of turning the cap 28 and thus alter the effective size of the timer aperture 16. At the same time the length of time necessary to empty the timer chamber 15 is also altered.

When the container 1 is rigid the dosage assembly 3 is provided with a venting duct in a manner known per se, said duct terminating further down in the container than the inlet openings 25. When an elastic, squeezable container is used such a venting duct is, of course, unnecessary. Independent of whether a rigid or an elastic, squeezable container is used the amount of fluid delivered is constant and independent of the pressure the container is subjected to. Furthermore the amount of fluid delivered is substantially independent of the viscosity of the fluid.

Figure 2:
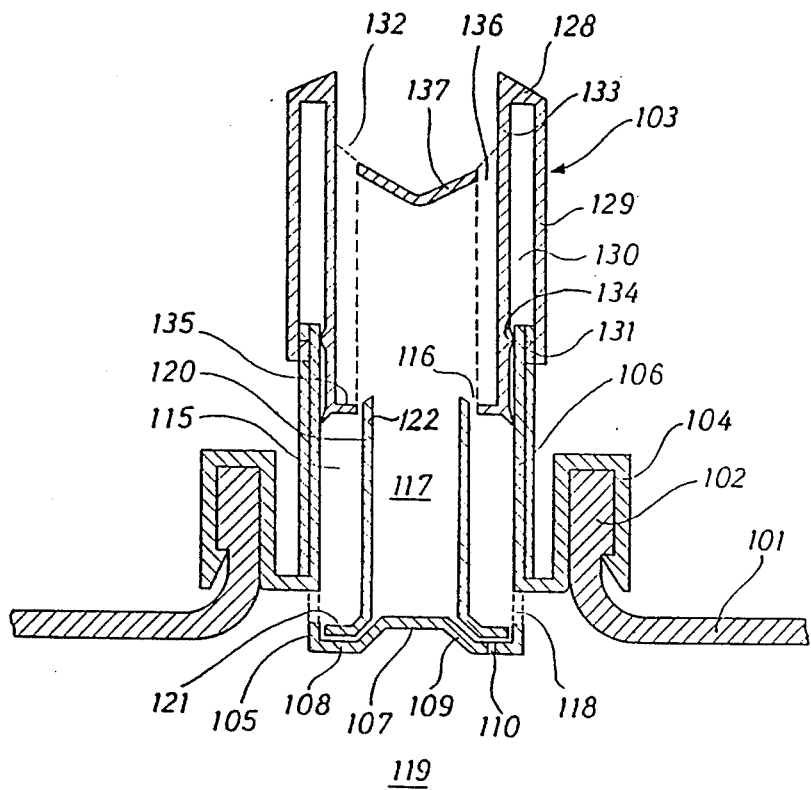
FIG. 2 is a diagrammatic, vertically sectional view through a second embodiment of an inventive container with dosage assembly.

FIG. 2 is a diagrammatic, vertically sectional view through a second embodiment of a dosage assembly 103 in a container 101. The dosage assembly 103 comprises a stopper 104 in tight and sealing engagement with the neck 102 of the container. The stopper 104 is provided with a cup-shaped part 105 with a skirt 106. The skirt 106 is coaxial with respect to the opening in the neck 102 of the container 101. The cup-shaped part 105 furthermore includes a bottom 107 in the interior 119 of the container 101, said bottom 107 having a planar, annular part 108 as well as a frustoconical part 109 facing away from the interior 119 of the container. Adjacent the bottom the skirt 106 is provided with a number of feed openings 118 and the planar, annular part 108 of the bottom 107 is provided with a number of capillary holes 110. The cup-shaped part 105 has a tubular plunger 120 with an outward flange 121 adjacent the interior 119 of the container, said flange having an outer diameter substantially corresponding to the inside diameter of the cup-shaped part 105.

A cap 128 is provided on the skirt 106 of the stopper 104, said cap having an outer cylindrical skirt 129 and an inner cylindrical skirt 133, both annuli forming an oblong, circular groove 130 to receive the skirt 106 of the stopper 104. The outer skirt 129 of the cap 128 has a radially inwardly extending projection 131 provided with an inner thread in engagement with a corresponding outer thread on the skirt 106 of the stopper 104. The inner skirt 133 is provided with a radially outwardly extending circular bead 134 sealingly abutting the inside surface of the skirt 106 of the stopper 104.

At its lower end the inside skirt of the cap 128 has a radially inwardly extending flange 135, the inner diameter of said flange being slightly smaller than the outer diameter of a tubular part 122 of the plunger 120. This results in a timer aperture 116 between the tubular part 122 and the flange 135, said timer aperture being part of a timer chamber 115 defined by the plunger 120, the flange 135 of the cap 128 and the skirt 106 of the stopper 104.

A number of ribs 136 extend radially inwardly from the inner cylindrical skirt 133 of the cap 128, said ribs controlling the tubular part 122 of the plunger 120. The upper end of the radial ribs 136 are provided with a central deflector plate 137 forming an outlet opening 132 together with the inner skirt 133.

When the container 101 with the dosage assembly 103 is tilted or turned 180° the timer chamber 115 is substantially momentarily filled with fluid flowing through the feed opening 118. When the capillarity of the capillary holes 110 ends and the timer chamber 115 is filled the plunger 120 begins to move forward and the fluid begins to flow into the passageway 117 via the feed opening 118. When the plunger 120 has travelled a predetermined distance the feed opening no longer communicates with the timer chamber 115, but with the inside of the plunger. From the passageway 117 the fluid flows out through the outlet opening 132. During the forward movement of the plunger 120 caused by the prevailing pressure fluid continues to flow out of the timer through the timer aperture 116. Eventually the plunger 120 reaches its final position, where the flange 121 sealingly abuts the inwardly extending flange 135 of the cap 128 and the upper terminal surface of said flange sealingly abuts the central deflector plate 137. Thus the flow of fluid through the dosage assembly 103 is completely blocked. When the container 101 is returned to its vertical position after the finishing of the dosing process the plunger 120 drops immediately back to the start position of FIG. 2 due to the influence of gravity.

The amount of fluid delivered during the dosing process is adjusted by means of displacing the cap 128 with respect to the stopper 104 thus changing the length of travel of the plunger 120 from its start position of FIG. 2 to its final position.

When the cap is completely screwed down the passage of fluid through the dosage assembly is completely blocked.

Figure 3:
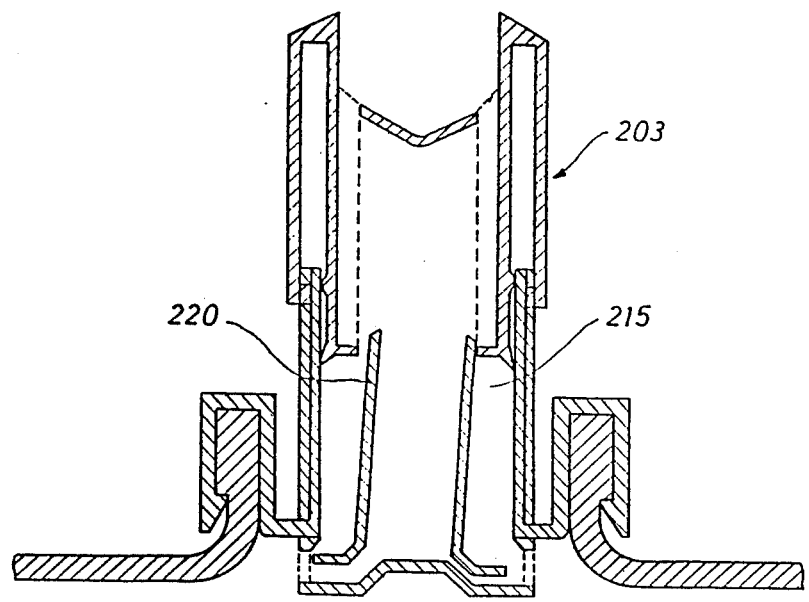
FIG. 3 is a diagrammatic, vertically sectional view through a modified embodiment of the dosage assembly of FIG. 1.

FIG. 3 is a diagrammatic, vertically sectional view through a modified embodiment of the dosage assembly of FIG. 2. The main difference compared to FIG. 2 is that the plunger is not retained in its start position by means of capillarity during the filling of the timer chamber, cf. FIG. 2, but the plunger 220 tilts during the moment necessary for filling the timer chamber 215.

Figure 4:
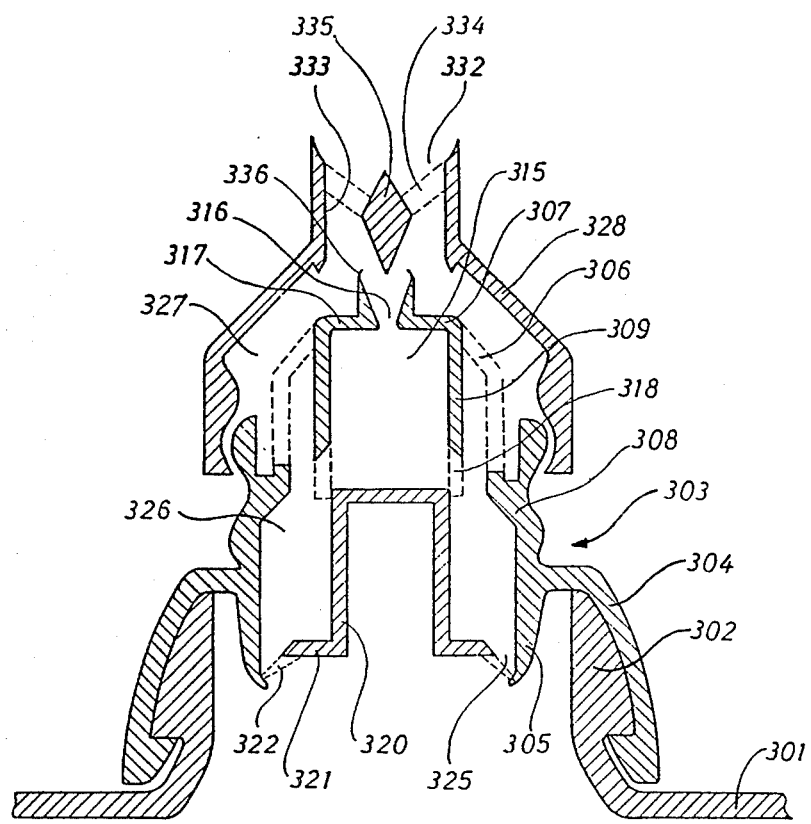
FIG. 4 is a diagrammatic, vertically sectional view through a third embodiment of an inventive container with dosage assembly.

FIG. 4 illustrates a third embodiment of a dosage assembly 103 in a container 301 comprising a stopper 304 sealingly joined to the neck 302 of the container, and a lower cylindrical part 305 connected with a suprajacent upper cup-shaped part 307 by means of a conical part 308 and a number of ribs 306. The hollow side of the cup-shaped part 307 faces down towards the bottom of the cylindrical part 305 and forms a timer chamber 315. The timer chamber 315 is provided with a central timer aperture 316 in a lower wall 317 and a number of feed openings 318 at the free end of a cylindrical wall 309. A cup-shaped plunger 320 is sealingly and displaceably installed in the cup-shaped part 307, the hollow side of said plunger facing the same direction as the hollow side of the cup-shaped part 307. Furthermore the plunger 320 is provided with a radially outwardly facing flange 321 terminating in a number of control fingers 322 controlling and supporting the inner surface of the cylindrical part 305.

A substantially cup-shaped cap 328 is in threaded engagement with a stopper 304 surrounding the upper, cup-shaped part 307 and the ribs 306 of the stopper to form a passageway 327 around the cup-shaped part 307. The upper end of the cap 328 is provided with an outlet 332 defined by an upper outlet passageway 333 and a torpedo-shaped body 335 connected to said passageway by means of ribs 334. The torpedo-shaped body 335 sealingly abuts a circular lip 336 adjacent the timer aperture 316 by means of screwing the cap 328 down for altering the effective size of the timer aperture.

When the container is tilted or turned 180° fluid flows out into the timer chamber 315 via inlet openings 325 between the control fingers 322 of the plunger 320, a circular chamber 326 surrounding the plunger, and the feed openings 318. Simultaneously fluid flows from the chamber 326 into the passageway 327 through the central timer aperture 316 and towards the outlet opening 332. Thus the plunger moves forward owing to the prevailing pressure and displaces fluid from the timer chamber 315. At the same time fluid flows through the circular chamber 326 and the passageway 327 directly out through the outlet opening 332 until the flange 321 of the plunger 320 eventually abuts the conical part 308, thus preventing further fluid flow through the dosage assembly. In the final position the bottom of the plunger 320 substantially abuts the lower wall 327 of the cup-shaped part 307 so that the timer chamber 315 is substantially empty.

Due to gravity the plunger 320 immediately drops back to the position of FIG. 4 and is ready for a new dosing process, when the container 301 with dosage assembly 303 is returned to its vertical position.

Figure 5:
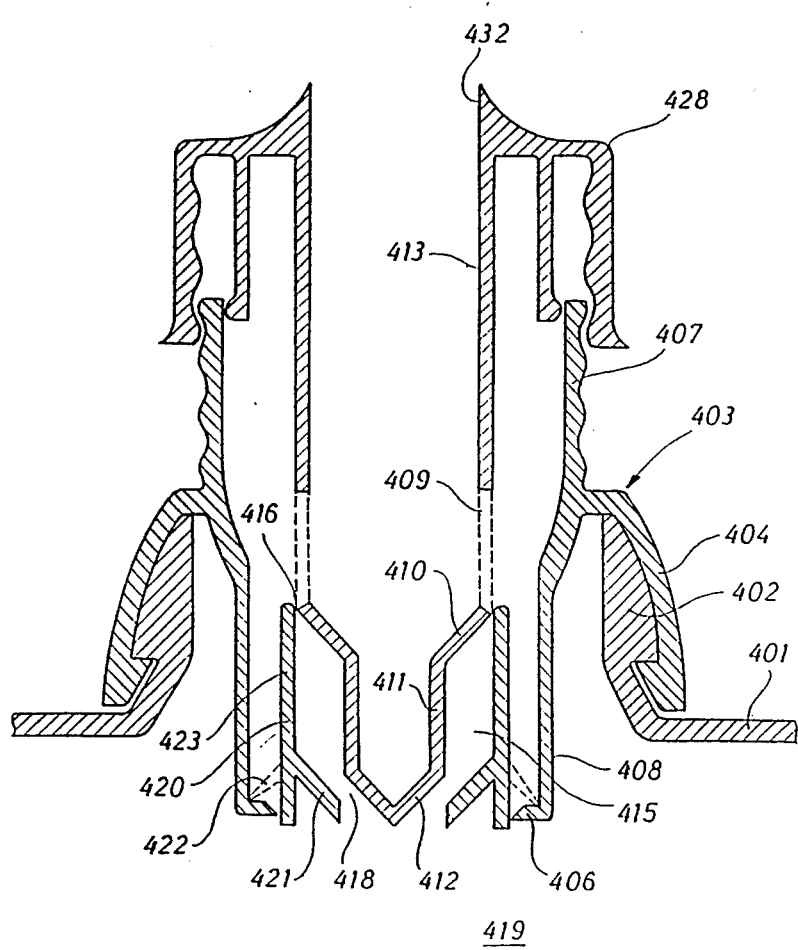
FIG. 5 is a diagrammatic, vertically sectional view through a fourth embodiment of an inventive container with dosage assembly.

FIG. 5 illustrates a fourth embodiment of a container 401 with dosage assembly 403 comprising a stopper 404 in sealing and tight engagement with a neck 402 of the container 401. Furthermore the stopper is provided with a cylindrical part 408 facing the interior 419 of the container and terminating in an inwardly extending flange 406 and an outwardly extending thread 407, the latter being in sealing, threaded engagement with a cap 428. The cap 428 has an upper cylindrical part 413 extending towards the interior 419 of the container, the upper end of said part 413 forming an outlet opening 432 and the lower end of said part 413 being provided with a number of radially extending throughflow openings 409. At its lower end the upper cylindrical part 413 changes into a smaller, lower cylindrical part 411 via a conical part 410, said part 41 terminating in a cone-shaped part 412.

A cylindrical plunger 420 having a lower conical flange 421 of a conicity corresponding to the conicity of the conical part 410 as well as radially outwardly extending control fingers 422 is provided in an area at the lower cylindrical part 411 of the cap 428 to form a timer chamber 415. The cylindrical part of the plunger 420 is of an inner diameter substantially corresponding to the outer diameter of the upper cylindrical part 413 of the cap 428. The flange 421 is of an inner diameter substantially corresponding to the outer diameter of the lower cylindrical part 411 of the cap 428. In the start position of the plunger of FIG. 5 a feed opening 418 is provided between the conical flange 421 of the plunger 420 and the cone-shaped part 412 of the cap 428. A timer aperture 416 is provided between the throughflow openings 409, extending a short distance downwards on the conical part 410 of the cap 428, and the cylindrical part 423 of the plunger 420, extending a short distance upwards on the upper cylindrical part 413 of the cap 428.

When the container is tilted or turned 180° the timer chamber is substantially momentarily filled with fluid. The plunger 420 moves outwards simultaneous with the timer chamber 415 being emptied. The fluid flows around the plunger 420, through the throughflow openings 409 and forward through the outlet openings 425. When the timer chamber is emptied the plunger 420 thus reaches a final position where its flange 421 sealingly abuts the conical part 410. At the same time the upper end of the cylindrical part 423 sealingly abuts the upper cylindrical part 413 of the cap 428 directly above the throughflow openings 409. Thus the flow of fluid through the dosage assembly is blocked.

The amount of fluid is adjusted by means of turning the cap 428 with respect to the stopper 404 thus altering the travel of the plunger 420 from its start position to its final position simultaneous with the effective size of the throughflow openings 409 being changed.

Figure 6:
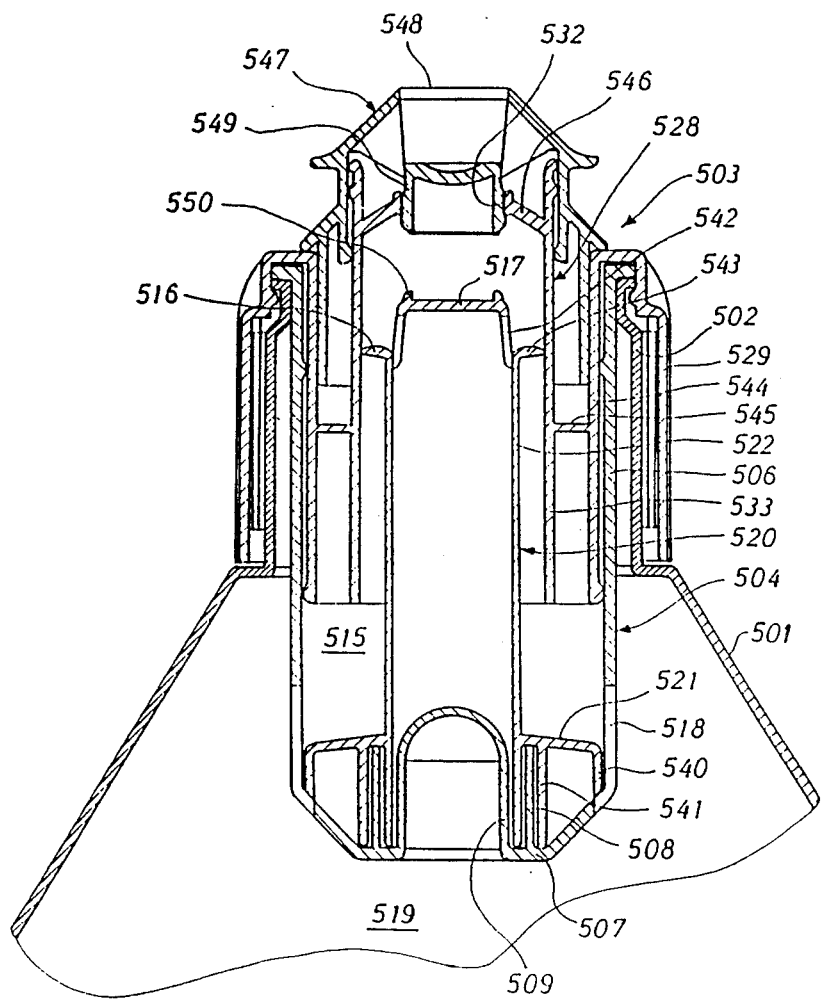
FIG. 6 is a diagrammatic, vertically sectional view through a fifth embodiment of an inventive container with dosage assembly.

FIG. 6 is a diagrammatic, vertically sectional view through a dosage assembly 503 of a container 501. This embodiment corresponds in principle to the one of FIG. 2. It comprises a stopper 504 in tight and sealing engagement with a neck 502 of the container 501 and extending into the interior 519 of the container. The stopper 504 is substantially cup-shaped and provided with a skirt 506 extending substantially coaxial to the neck 502 of the container 501 and with a bottom 507 in the interior 519 of the container. The bottom 507 has a central, dome-shaped, forwardly extending projection 509 and an annular wall 508 spaced from and surrounding the dome-shaped projection 509. Adjacent the bottom 507 the skirt 506 is provided with a plurality of feed openings 518.

Inside the stopper 504 there is a substantially tubular plunger 520 with a tubular part 522 and a flange 521 adjacent the interior 519 of the container 501, said flange having an outer flange wall 540 extending towards the interior of the container, the diameter of said flange wall substantially corresponding to the inner diameter of the skirt 506 of the stopper 504. The flange 521 is further provided with a middle flange wall 541 extending towards the interior of the container, said middle flange wall 541 being spaced from and surrounding the annular wall 508 of the stopper 504 in the start position of the plunger, cf. FIG. 2. In the position illustrated in FIG. 6 the bottom end of the tubular part 522 of the plunger 520 is situated at a distance between the annular wall 508 of the stopper 504 and the dome-shaped projection 509. The upper end of the plunger 520 has a terminal wall 517. Adjacent the terminal wall 517 openings 542 are provided in the tubular part 522. A radial upper flange 543 is provided directly below these openings.

A cap 528 is placed axially displaceable with respect to the stopper 504 and comprises an outer cylindrical skirt 529 with an inner thread in engagement with a corresponding outer thread on the neck 502 of the container 501, a middle cylindrical skirt 544 extending into the stopper 504 and being in sealing engagement with the skirt 506 of the stopper 504 by means of an inner annular bead provided on said skirt 506, as well as an inner cylindrical skirt 533 extending parallel to the middle cylindrical skirt 544 inside the latter and joined thereto by means of a transverse wall 545. Adjacent the upper end of the inner cylindrical skirt 533 an upper wall 546 extends obliquely inwards to define an outlet opening 532. A timer aperture 516 is situated between the inner surface of the inner cylindrical skirt 533 and the upper flange 543 of the plunger 520. The plunger 520, the cap 528 and the stopper 504 define a timer chamber 515. The outside of the upper end of the inner cylindrical skirt 533 of the cap 528 is sealingly equipped with a displaceable outlet stopper 547 of the so-called pull/push type to open or block the outlet opening 532. The outlet stopper 547 has an upper opening 548 and an inner blocking means 549 being moved from the position shown in FIG. 6 blocking the outlet opening 532 to a position opening said opening by axial displacement of the stopper.

When the container 510 with the dosage assembly 503 is tilted or turned 180° the timer chamber 515 is substantially momentarily filled with fluid flowing through the feed opening 518. When the timer chamber 515 is filled and the fluid distributed between the spaces created between the stopper 504, the bottom 507 and the flange 521 of the plunger 520, the plunger 520 moves forward and fluid begins to flow via the feed opening 518 into the inside of the plunger. When the plunger has travelled a predetermined distance the feed opening does no longer communicate with the timer chamber 515 but with the inside of the plunger 520. From the inside of the plunger the fluid flows through the openings 542 at the upper end of the plunger 520 and out through the outlet opening 532 and the stopper opening 548 provided that the stopper 547 has been pulled up so that its blocking means 549 does not block said opening 532. During the forward movement of the plunger 520 caused by the prevailing pressure the fluid continues to flow out of the timer chamber 515 through the timer opening 516. Eventually the plunger 520 reaches its final position, where a sealing bead 550 provided on the terminal wall 517 of the plunger sealingly abuts the upper concial wall 546 of the cap 528 and blocks the passage of fluid through the outlet opening 532. At the end of the dosing process when the container 501 is returned to its vertical position the plunger 520 drops immediately back to the start position shown in FIG. 6 and the dosage assembly is ready for a new dosage. By turning the cap 528 it is axially displaced owing to the threaded engagement with the neck 502 of the container 501 allowing an adjustment of the travel of the plunger 520 from its start position to its final position and thus of the fluid dosage.

Figure 7:
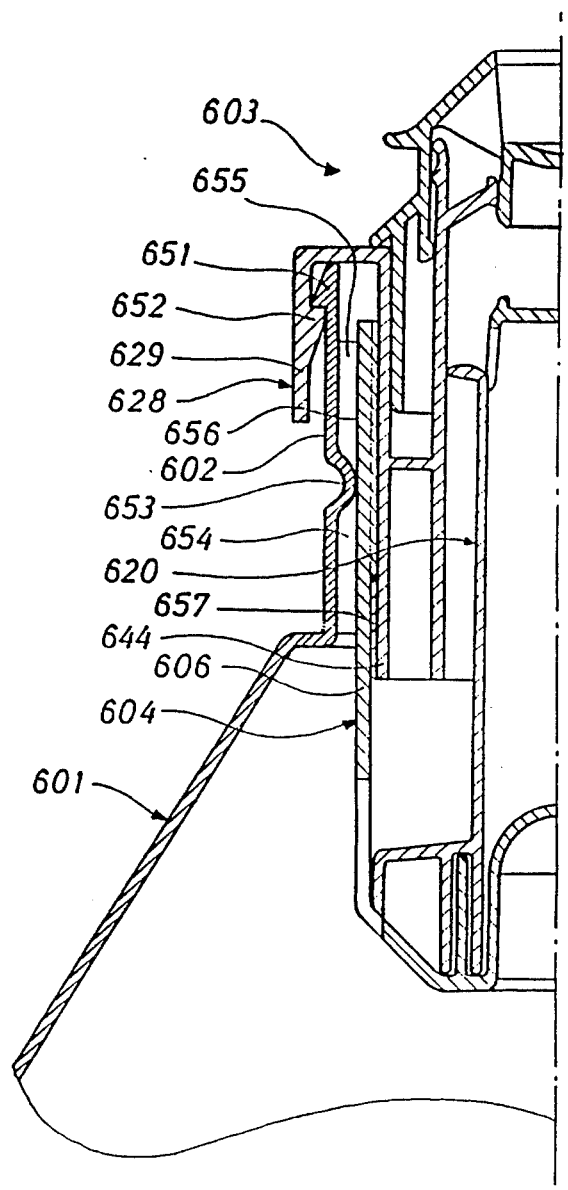
FIG. 7 is a diagrammatic, vertically sectional view through a sixth embodiment of an inventive container with dosage assembly.

FIG. 7 is part of a diagrammatic vertically sectional view of a sixth embodiment of a dosage assembly 603 substantially corresponding to the one of FIG. 6. In this embodiment, however, the length of travel of a plunger 620 from the shown start position to its final position is adjusted by the displacement of a stopper 604 and not, as in FIG. 6, by displacement of the cap.

The upper end of a neck 602 of a container 601, is provided with an outer, annular locking ring 651 being in engagement with a corresponding locking ring 652 on the inner side of an outer cylindrical skirt 629 of a cap 628, cf. FIG. 7. Hereby the cap 628 is rotatably mounted on the neck 602 of the container 601 without being axially displaceable. The neck 602 is moreover provided with an indentation 653 in engagement with a groove 654 on the outside of the skirt 605 of the stopper 604, said groove 654 being defined by two parallel, axially extending strips, only one 655 being visible in FIG. 7.

The inner side of the skirt 605 of the stopper 604 is equipped with a thread 656 in engagement with an outer thread 657 provided on the outer side of a middle cylindrical skirt 644 of the cap 628. By turning the cap 628 the stopper 604 is displaced in axial direction but prevented from rotating due to the engagement of the indentation 653 with the groove 654. The axial displacement of the stopper 604 adjusts the length of travel of the plunger 620 and thus the fluid dosage. The embodiment of FIG. 7 corresponds to the one shown in FIG. 6 apart from the above-mentioned parts and operates in a corresponding manner.

All parts of the dosage assembly are manufactured from injection moulded plastics. The cap can, for example, be made from polyethylene (LD), the stopper from polypropylene and the plunger from thermosetting plastics, such as urea formaldehyde or melanine or optionally from a filled thermoplast, such as $BaSO_4$-filled polyethylene.

The invention can be varied in many ways without thus deviating from the scope of the invention. The cap can, for example, be non-adjustably connected with the stopper and optionally be an integral part thereof.

I claim:

1. A dosage-metering assembly for a fluid container, which has a neck with an opening through which fluid is dispensed when the container is inverted, comprising:
    a stopper member which is mounted on the neck of the container in alignment with a central axis of the neck opening for the dispensing of fluid and which has an outlet portion concentric with the central axis provided with an outlet passage therethrough for the outflow of fluid from the container, and a dosage-metering portion formed with an annular wall concentric with the central axis and extending in the neck of the container;
    a plunger disposed concentrically with the central axis and with said annular wall of said stopper member and being slidably movable under gravity along the central axis from a start position to an end position when the container is inverted, said plunger having a timer flange which extends radially to said annular wall and is in slidable sealing engagement therewith so as to sweep through a predetermined volume defined from the start position to the end position of said plunger, said predetermined volume swept by said timer flange of said plunger constituting a timer chamber which communicates by fluid flow into said outlet passage of said stopper member;
    a feed opening positioned near the start position of said plunger communicating into said timer chamber through which fluid in the container feeds into said timer chamber and into said outlet passage of said stopper member when the container is inverted, said feed opening being cut off by said timer flange of said plunger moving past said feed opening a predetermined time after the container is inverted, said timer flange thereby cutting off further flow of fluid from said feed opening into said timer chamber after said predetermined time from the start position, and said timer chamber thereby being emptied of fluid when the plunger reaches the end position in order to allow quick return of the plunger to the start position when the container is returned to its upright position.

2. A dosage-metering assembly according to claim 1, wherein said first mentioned annular wall of said dosage-metering portion of said stopper member is located radially outwardly of said timer chamber, and wherein an inner annular wall is disposed radially inwardly of said timer chamber, said inner annular wall extending concentrically and in parallel with the first-mentioned annular wall, and an aperture is provided in said inner annular wall near the end position of said plunger communicating into said outlet passage of said stopper member for fluid flow from said timer chamber into said outlet passage as said plunger moves toward the end position.

3. A dosage-metering assembly according to claim 2, wherein said plunger has a cup shape formed with a cylindrical skirt and a bottom wall, said cylindrical skirt being in slidable engagement with said inner annular wall and having said timer flange at a forward end thereof in slidable engagement between said inner annular wall and said first-mentioned annular wall, said timer chamber thereby being defined as an annular space between the two annular walls.

4. A dosage-metering assembly according to claim 3, wherein said plunger has inlet openings in said cylindrical skirt near said bottom wall for secondary flow of fluid on an inner side of said inner annular wall into said outlet passage of said stopper member, said inlet openings and the secondary fluid flow being cut off by said inner annular wall as said plunger moves toward its end position.

5. A dosage-metering assembly according to claim 1, further comprising a closure cap mounted on said outlet portion of said stopper member for closing said outlet passage.

6. A dosage-metering assembly according to claim 5, wherein said closure cap has an exit opening for outflow of fluid from said outlet passage of said stopper member, and includes means for adjusting the fluid flow through said exit opening.

7. A dosage metering assembly according to claim 6, wherein said stopper member includes a rod-shaped body aligned on the central axis with one end extending through said outlet passage toward said exit opening of said closure cap, said closure cap having engagement means engaging said outlet portion of said stopper member for adjustably displacing said closure cap such that said exit opening of said closure cap is movable from a fully-opened position remote from the end of said rod-shaped body to a closure position in which said exit opening is blocked by the end of said rod-shaped body.

8. A dosage-metering assembly according to claim 1, wherein said plunger has a tubular shape formed with a tubular portion disposed radially inwardly from said annular wall and has said timer flange at a rearward end thereof in slidable sealing engagement with said annular wall, said timer chamber thereby being defined as an annular space between said annular wall and said tubular portion and timer flange of said plunger.

9. A dosage-metering assembly according to claim 8, further comprising a closure cap mounted on said outlet portion of said stopper member having an exit opening at a forward end thereof and a rearward flange at a rearward end extending radially inwardly toward said tubular portion of said plunger, wherein said rearward flange guides said tubular portion and provides an abutment surface for the end position of said timer flange of said plunger, said closure cap further having engagement means engaging said outlet portion of said stopper member for adjustably displacing said closure cap along the central axis such that said rearward flange defines an adjustable end position for the movement of said plunger.

10. A dosage-metering assembly according to claim 1, wherein said dosage-metering portion of said stopper member includes a forward cylindrical portion and a rearward cylindrical portion of a lesser radius, both being concentric with the central axis, and a shoulder portion connecting said cylindrical portions, said forward cylindrical portion having timer apertures therein communicating into an inner bore thereof defining said outlet passage, and wherein said plunger is formed with a cylindrical wall in slidable sealing engagement with said forward cylindrical portion and with said timer flange at a rearward end thereof extending radially inwardly to said rearward cylindrical portion, said timer chamber thereby being defined as an annular space between said rearward cylindrical portion, said shoulder portion, and said cylindrical wall and timer flange of said plunger, said shoulder portion being abutted by said timer flange to define the end position of said plunger at which said cylindrical wall of said plunger cuts off said timer apertures.

11. A dosage-metering assembly according to claim 10, wherein said stopper member has a first part mounting said cylindrical and shoulder portions, a second part mounted to the neck of the container, and engagement means engaging said first part with said second part for adjustably displacing said first part along the central axis so that said shoulder portion defines an adjustable end position for the movement of said plunger.

12. A dosage-metering assembly according to claim 10, wherein said plunger has guide fingers at a rearward end thereof which extend to side wall portions of said stopper member, said guide fingers allowing a secondary flow of fluid around said guide fingers and through said timer apertures in said forward cylindrical portion of said dosage-metering portion.

13. A dosage-metering assembly according to claim 1, wherein said dosage-metering portion of said stopper member is formed with a cylindrical skirt which extends concentrically into the neck of the container in sealing engagement therewith, and is joined to a bottom portion having said feed opening at an intersection thereof with said cylindrical skirt, and wherein said plunger has a tubular shape formed by a tubular portion disposed radially inwardly from said cylindrical skirt and said timer flange disposed at a rearward end thereof in slidable sealing engagement with said cylindrical skirt, said timer chamber thereby being defined as an annular space between said cylindrical skirt and said tubular portion and timer flange of said plunger.

14. A dosage-metering assembly according to claim 13, wherein said outlet portion of said stopper member is formed with an inner cylindrical skirt, of lesser radius than said first-mentioned cylindrical skirt, having the outlet passage defined therethrough, a rearward end which is an abutment surface defining the end position of said timer flange of said plunger, and a forward end having an exit opening formed therein, wherein said tubular portion of said plunger is spaced radially inwardly from said inner cylindrical skirt and has a hollow center bore therethrough, upper flange parts at a forward end thereof in sliding contact with said inner cylindrical skirt, timer apertures around said upper flange parts, and a terminal wall at the forward end thereof facing said exit opening, and wherein said timer flange cuts off fluid flow from said feed opening into said timer chamber after said predetermined time from the start position and allows a secondary fluid flow from said feed opening around said timer flange into the hollow center bore of said tubular portion of said plunger and out through said timer apertures at the forward end thereof and through said exit opening of said outlet portion of said stopper member, until said plunger moves to the end position and said terminal wall thereof blocks further fluid flow through said exit opening.

15. A dosage-metering assembly according to claim 14, wherein said stopper member includes a push-pull-type stopper displaceably mounted on the forward end of said outlet portion and having a central outer opening and an inner blocking element spaced from the outer opening along the central axis, said blocking element being positioned for sealing said exit opening of said outlet portion of said stopper member when said stopper is displaced to a closure position.

16. A dosage-metering assembly according to claim 14, wherein said outlet portion of said stopper member includes engagement means engaging an outer part of the neck of the container for adjustably displacing said outlet portion and said inner cylindrical skirt along the central axis such that said rearward end of said inner cylindrical skirt defines an adjustable end position for the movement of said timer flange of said plunger.

17. A dosage-metering assembly according to claim 14, wherein said first-mentioned cylindrical skirt of said dosage-metering portion of said stopper member is axially displaceable in the neck of the container and has a threaded portion, and said stopper member includes a rotatable cap ring mounted so as to be rotatable but not axially displaceable on the neck of the container, said cap ring having engagement means engaging said threaded portion of said first-mentioned cylindrical skirt for adjustably displacing said cylindrical skirt along the central axis such that said bottom portion of said cylindrical skirt defines an adjustable start position for the movement of said plunger.

18. A dosage-metering assembly for a fluid container, which has a neck with an opening through which fluid is dispensed when the container is inverted, comprising:

a stopper member which is mounted on the neck of the container in alignment with a central axis of the neck opening for the dispensing of fluid, said member including an outlet passage therethrough for the outflow of fluid from the container, and a lower cylindrical part which is concentric with the central axis and extends into the neck of the container, said cylindrical part including an inwardly disposed conical part;

an upper cup-shaped part which encloses a timer chamber, said upper part being disposed in suprajacent relation and connected to said conical part, said upper part having a lower wall and a cylindrical wall depending from said lower wall and terminating in a downwardly oriented open end, said lower wall including a central timer aperture, said cup-shaped part defining a feed opening at a terminal end of said cylindrical wall; and a plunger which is slidably movable under gravity along the central axis from a start position which is offset axially from said upper part to an end position within said upper part when the container is inverted, said plunger including a radial outwardly facing flange which is disposed in slidable contact with said cylindrical part and spaced therefrom to define an inlet opening, said flange being movable from said start position in which said inlet opening communicates with said timer chamber via said feed opening and with said outlet passageway, and said end position in which said flange obstructs fluid flow through said feed opening and outlet passageway;

so that when the container is tilted fluid flows through said timer aperture and outlet passageway to dispense fluid from the container, said plunger evacuating said timer chamber by sliding therein to said end position, said plunger thereafter returning to said start position when the container is returned to its upright position.

19. A dosage-metering assembly according to claim 18, wherein said plunger has an inverted cup shape formed with a cylindrical body, and said flange includes a guide finger which extends to said cylindrical wall part, said guide finger defining said inlet opening.

20. A dosage-metering assembly according to claim 18, further comprising a closure cap mounted on said stopper member having a forward opening with a plug body centered therein, and engagement means for adjustably displacing said closure cap along the central axis such that said plug body is movable from a fully-opened position remote from said upper cup shaped part to a closure position in which said timer aperture in said upper cup shaped part is blocked by said plug body.

* * * * *